United States Patent
Yokoyama (12) 
(10) Patent No.: US 12,054,131 B2
(45) Date of Patent: Aug. 6, 2024

(54) ELECTRIC BRAKE APPARATUS

(71) Applicant: Hitachi Astemo, Ltd., Ibaraki (JP)

(72) Inventor: Wataru Yokoyama, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 405 days.

(21) Appl. No.: 17/426,003

(22) PCT Filed: Jan. 24, 2020

(86) PCT No.: PCT/JP2020/002445
§ 371 (c)(1),
(2) Date: Jul. 27, 2021

(87) PCT Pub. No.: WO2020/158587
PCT Pub. Date: Aug. 6, 2020

(65) Prior Publication Data
US 2022/0153251 A1   May 19, 2022

(30) Foreign Application Priority Data
Jan. 29, 2019   (JP) ................. 2019-013233

(51) Int. Cl.
*B60T 13/74*   (2006.01)
*B60T 8/172*   (2006.01)
(Continued)

(52) U.S. Cl.
CPC ............ *B60T 13/741* (2013.01); *B60T 8/172* (2013.01); *B60T 8/885* (2013.01); *B60T 17/22* (2013.01)

(58) Field of Classification Search
CPC ........ B60T 13/741; B60T 8/172; B60T 8/321; B60T 8/885; B60T 17/22; B60T 7/042
(Continued)

(56) References Cited

U.S. PATENT DOCUMENTS 9,434,368 B2 *   9/2016   Ohara ............... B60T 7/042
2007/0084682 A1 *   4/2007   Griffith ............ B60T 13/741
                                                              188/156
(Continued)

FOREIGN PATENT DOCUMENTS

JP   2003113877 A *   4/2003 ............. B60T 13/74
JP   2016-89903         5/2016
(Continued)

OTHER PUBLICATIONS

International Search Report issued Feb. 18, 2020 in International Application No. PCT/JP2020/002445, with English translation.
(Continued)

*Primary Examiner* — Christopher P Schwartz
(74) *Attorney, Agent, or Firm* — Wenderoth, Lind & Ponack, L.L.P.

(57) ABSTRACT

An electric brake apparatus includes a brake mechanism, a parking mechanism, and a main ECU and rear electric brake ECUs. The main ECU performs re-holding control (re-clamping) of, after holding a braking force by the parking mechanism, releasing the holding of the braking force with the braking force applied or maintained and further applying the braking force, and then holding the braking force by the parking mechanism after that. In this case, the main ECU does not release the braking force on a rear right wheel until completing the re-holding control on a rear left wheel side. Alternatively, the main ECU does not release the braking force on the rear left wheel side until completing the re-holding control on the rear right wheel.

9 Claims, 6 Drawing Sheets

(51) Int. Cl.
  *B60T 8/88*    (2006.01)
  *B60T 17/22*   (2006.01)
(58) Field of Classification Search
  USPC .............................. 188/156–164, 171, 1.11 E
  See application file for complete search history.

(56)  References Cited

U.S. PATENT DOCUMENTS

2021/0269001 A1* 9/2021 Suzuki .................... B60T 8/321
2022/0355771 A1* 11/2022 Fujita ..................... B60T 17/22

FOREIGN PATENT DOCUMENTS

| JP | 2018-184093 | 11/2018 |
| WO | 2014-46824 | 3/2014 |

OTHER PUBLICATIONS

English translation of Written Opinion of the International Searching Authority issued Feb. 18, 2020 in International Application No. PCT/JP2020/002445.

* cited by examiner

ELECTRIC BRAKE APPARATUS

TECHNICAL FIELD

The present invention relates to an electric brake apparatus that applies a braking force to a vehicle such as an automobile.

BACKGROUND ART

There is known a brake apparatus equipped with an electric parking brake function that is actuated based on driving of an electric motor as a brake apparatus mounted on a vehicle (PTL 1). On the other hand, PTL 2 discusses a technique that re-applies (re-clamps or re-holds) braking after a predetermined time has passed since the application in consideration of a reduction in the braking force according to thermal contraction of the disk rotor and the brake pads when the electric parking brake is applied (actuated).

CITATION LIST

Patent Literature

PTL 1: Japanese Patent Application Public Disclosure No. 2014-46824
PTL 2: Japanese Patent Application Public Disclosure No. 2016-89903

SUMMARY OF INVENTION

Technical Problem

For example, supposing that the electric brake apparatus that applies the braking force based on the driving of the electric motor is configured to operate as fail-open (i.e., the thrust force becomes zero) when a failure has occurred in the electric motor, one possible problem that may occur in this case will be described now. For example, when the re-clamping (re-holding) is performed on both the left and right wheels at the same time in the parking brake control (PKB control) of the electric brake apparatus equipped with such a fail-open mechanism, the braking force may be released if a failure has occurred due to, for example, a voltage drop during this re-clamping. As a result, the performance of keeping the vehicle stopped may decline.

Solution to Problem

An object of the present invention is to provide an electric brake apparatus capable of curbing a decline in a performance of keeping a vehicle stopped even when a failure has occurred during re-clamping (during re-holding control).

According to one aspect of the present invention, an electric brake apparatus includes a brake mechanism provided for each one of left and right wheels and configured to apply a braking force by thrusting forward a pressing member based on driving of an electric motor and pressing a braking member against a braking receiving member, a braking force holding mechanism configured to hold the braking force with the braking member pressed against the braking receiving member, and a controller configured to control the driving of the electric motor and actuation of the braking force holding mechanism. Until completing re-holding control on any one of the left and right wheels, the controller does not release the holding of the braking force on the other of the wheels, when performing the re-holding control. The re-holding control is control of, after holding the braking force by the braking force holding mechanism, releasing the holding of the braking force with the braking force applied or maintained, and further applying the braking force and then holding the braking force by the braking force holding mechanism after that.

According to one aspect of the present invention, an electric brake apparatus includes a brake mechanism provided for each one of left and right wheels and configured to apply a braking force by thrusting forward a pressing member based on driving of an electric motor and pressing a braking member against a braking receiving member, a braking force holding mechanism configured to hold the braking force with the braking member pressed against the braking receiving member, and a controller configured to control the driving of the electric motor and actuation of the braking force holding mechanism. The controller desynchronizes re-clamping between the left and right wheels when performing the re-clamping.

Advantageous Effects of Invention

According to the one aspect of the present invention, the decline in the performance of keeping the vehicle stopped can be curbed even when a failure has occurred during the re-holding control (re-clamping).

DESCRIPTION OF EMBODIMENTS

In the following description, an electric brake apparatus according to an embodiment will be described based on an example in which this electric brake apparatus is mounted on a four-wheeled automobile with reference to the accompanying drawings. Each of steps in a flowchart illustrated in FIG. 4 will be represented by the symbol "S" (for example, assume that "S1" represents step 1). Further, lines with two slash marks added thereto in FIGS. 1 and 2 indicate electricity-related lines.

Figure 1:
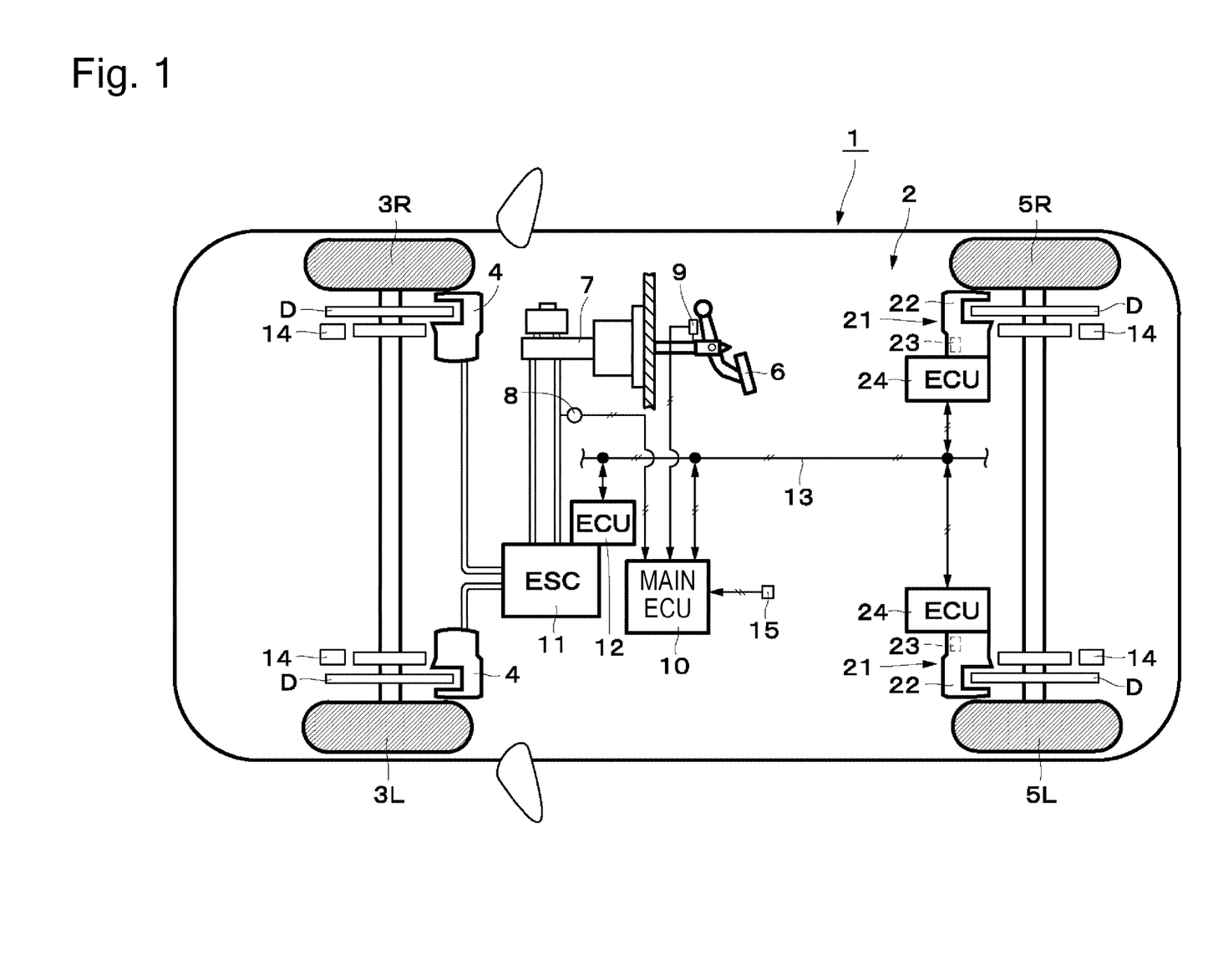
FIG. 1 schematically illustrates the system configuration of a vehicle on which an electric brake apparatus according to an embodiment is mounted.

FIGS. 1 to 5 illustrate the embodiment. In FIG. 1, a vehicle 1 is equipped with a brake apparatus 2 (a vehicle brake apparatus or a brake system), which applies braking forces to wheels (front wheels 3L and 3R and rear wheels 5L and 5R) to brake the vehicle 1. The brake apparatus 2 includes left and right hydraulic brake apparatuses 4 and 4 (front-side braking mechanisms), left and right electric brake apparatuses 21 and 21 (rear-side braking mechanisms), a master cylinder 7, and a hydraulic pressure sensor 8 and a pedal stroke sensor 9. The left and right hydraulic brake apparatuses 4 and 4 are provided in correspondence with the left-side front wheel 3L and the right-side front wheel 3R. The left and right electric brake apparatuses 21 and 21 are provided in correspondence with the left-side rear wheel 5L and the right-side rear wheel 5R. The master cylinder 7 generates a hydraulic pressure according to an operation (pressing) of a brake pedal 6 (an operation member). The hydraulic pressure sensor 8 and the pedal stroke 9 measure an amount of an operation performed by an operator (a driver) on the brake pedal 6.

The hydraulic brake apparatus 4 is formed by, for example, a hydraulic disk brake, and applies the braking force to the wheel (the front wheel 3L or 3R) according to the supply of the hydraulic pressure (a brake hydraulic pressure) thereto. The electric brake apparatus 21 is formed by, for example, an electric disk brake, and applies the braking force to the wheel (the rear wheel 5L or 5R) according to driving of an electric motor 22B (refer to FIG. 2). The hydraulic pressure sensor 8 and the pedal stroke sensor 9 are connected to a main ECU 10.

A hydraulic pressure supply apparatus 11 (hereinafter referred to as an ESC 11) is provided between the master cylinder 7 and the hydraulic brake apparatuses 4 and 4. The ESC 11 includes, for example, a plurality of control valves, a hydraulic pump, an electric motor, and a hydraulic pressure control reservoir (any of them is not illustrated). The hydraulic pump increases the brake hydraulic pressure. The electric motor drives this hydraulic pump. The hydraulic pressure control reservoir temporarily stores extra brake fluid therein. Each of the control valves and the electric motor in the ESC 11 are connected to a front hydraulic apparatus ECU 12. The front hydraulic apparatus ECU 12 includes a microcomputer. The front hydraulic apparatus ECU 12 controls the opening/closing of each of the control valves and the driving of the electric motor in the ESC 11 based on an instruction from the main ECU 10.

The main ECU 10 includes a microcomputer. The main ECU 10 calculates a target barking force for each of the wheels (the four wheels) according to a predetermined control program in reaction to inputs of signals from the hydraulic pressure sensor 8 and the pedal stroke sensor 9. The main ECU 10 transmits a braking instruction directed to each of the two front wheels to the front hydraulic apparatus ECU 12 (i.e., an ESC ECU) via a CAN 13 (Control Area Network) serving as a vehicle data bus based on the calculated braking force. The main ECU 10 transmits a braking instruction (a target thrust force) directed to each of the two rear wheels to each of rear electric brake ECUs 24 and 24 via the CAN 13 based on the calculated braking force.

Wheel speed sensors 14 and 14 are provided near the front wheels 3L and 3R and the rear wheels 5L and 5R, respectively. The wheel speed sensors 14 and 14 detect the speeds of these wheels 3L, 3R, 5L, and 5R (wheel speeds). The wheel speed sensors 14 and 14 are connected to the main ECU 10. The main ECU 10 can acquire the wheel speed of each of the wheels 3L, 3R, 5L, and 5R based on a signal from each of the wheel speed sensors 14 and 14.

Further, a parking brake switch 15 is provided near a driver's seat. The parking brake switch 15 is connected to the main ECU 10. The parking brake switch 15 transmits a signal (an actuation request signal) corresponding to a request to actuate a parking brake (PKB) (an application request working as a holding request or a release request working as an end request) according to an operation instruction from the driver to the main ECU 10. The main ECU 10 transmits a parking brake instruction directed to each of the two rear wheels to each of the rear electric brake ECUs 24 and 24 based on an operation on the parking brake switch 15 (the actuation request signal).

The electric brake apparatus 21 is an electric disk brake apparatus equipped with the PKB function. The electric brake apparatus 21 includes a brake mechanism 22, a parking mechanism 23 as a braking force holding mechanism, and the main ECU 10 and the rear electric brake ECU 24 as a braking device (an electric brake controller). In this case, the electric brake apparatus 21 includes a rotational angle sensor 25, a thrust force sensor 26, and a current sensor 27 (refer to FIG. 2 for all of them). The rotational angle sensor 25 serves as a position detector that detects a motor rotational position to exert positional control and thrust force control. The thrust force sensor 26 serves as a thrust force detector that detects a thrust force (a piston thrust force). The current sensor 27 serves as a current detector that detects a motor current.

The brake mechanism 22 is provided for each one of the left and right wheels (for each of the left and right wheels) of the vehicle 1, i.e., for each of the rear left wheel 5L side and the rear right wheel 5R side. The brake mechanism 22 is configured as an electric brake mechanism (an electric disk brake). The brake mechanism 22 includes a caliper 22A as a cylinder (a wheel cylinder), the electric motor 22B as an electric motor (an electric actuator), a speed reduction mechanism 22C, a rotation-linear motion conversion mechanism 22D, a piston 22E as a pressing member, brake pads 22F as a braking member (a pad), and a return mechanism 22G as a fail-open mechanism as illustrated in, for example, FIG. 2. The electric motor 22B is driven (rotated) according to supply of power thereto, and thrusts forward the piston 22E. The electric motor 22B is controlled by the rear electric brake ECU 24 based on the braking instruction (the target thrust force) from the main ECU 10. The speed reduction mechanism 22C slows down the rotation of the electric motor 22B and transmits it to the rotation-linear motion conversion mechanism 22D.

Figure 2:
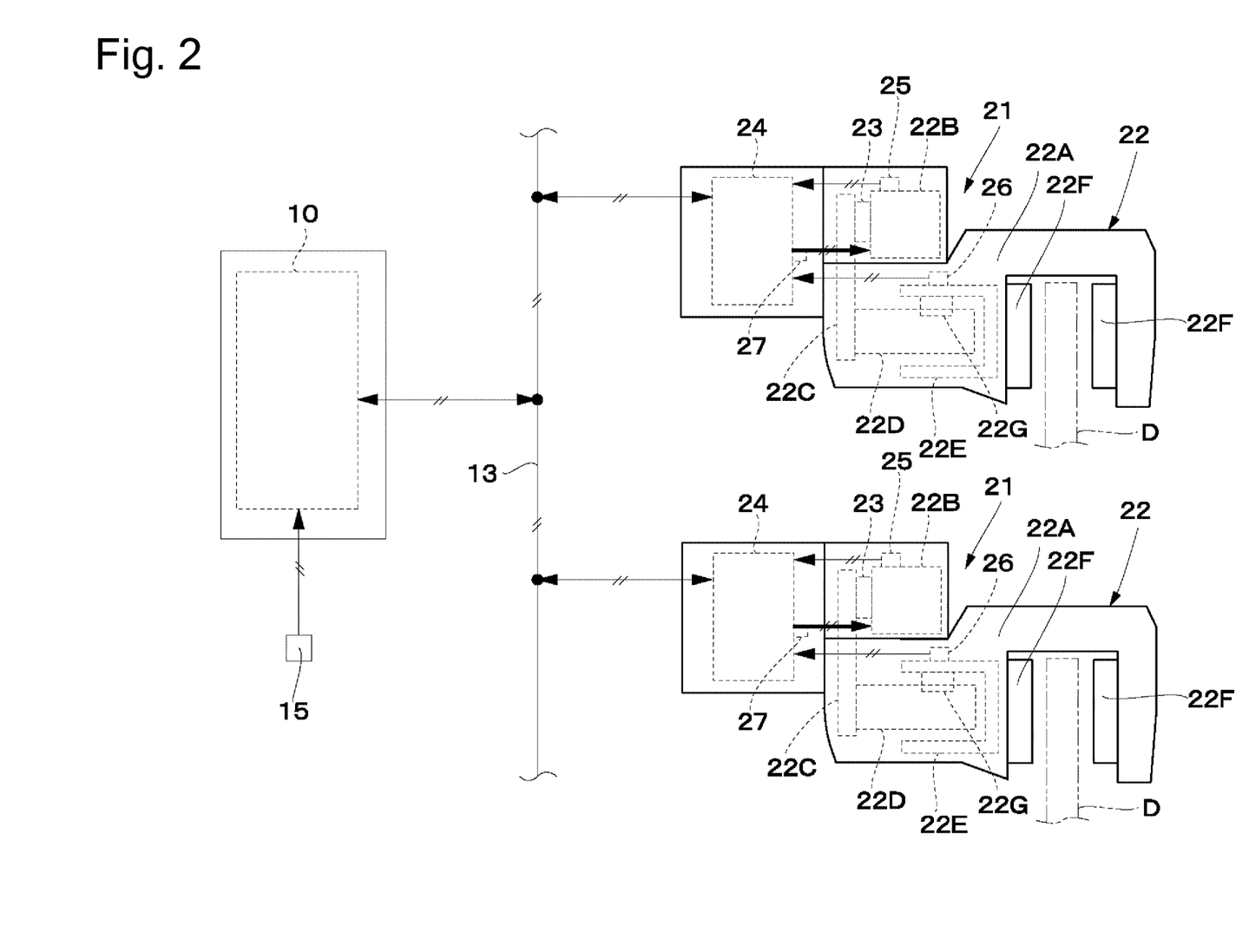
FIG. 2 schematically illustrates the electric brake apparatus illustrated in FIG. 1 together with a main ECU.

The rotation-linear motion conversion mechanism 22D converts the rotation of the electric motor 22B transmitted via the speed reduction mechanism 22C into an axial displacement of the piston 22E (a linear-motion displacement). The rotation-linear motion conversion mechanism 22D includes a push rod (not illustrated) as a shaft member (a rotational member). The push rod thrusts (advances) the piston 22E according to the driving of the electric motor 22B. The piston 22E is thrust forward according to the driving of the electric motor 22B, and moves the brake pads 22F. The brake pads 22F are pressed against a disk rotor D as a braking receiving member (a disk) by the piston 22E. The disk rotor D rotates together with the wheel (the rear wheel 5L or 5R). The brake mechanism 22 transmits the thrust force generated according to the driving of the electric motor 22B to the piston 22E moving the brake pads 22F. In sum, the brake mechanism 22 thrusts forward the piston 22E according to the electric motor 22B and presses the brake pads 22F against the disk rotor D, thereby applying the braking force.

The return mechanism 22G forms the electric brake apparatus 21 (more specifically, the brake mechanism 22). The return mechanism 22G is a fail-open mechanism that moves the piston 22E in a direction for releasing the braking force when the parking mechanism 23 does not hold the braking force and the electric motor 22B does not generate the rotational force (a torque). The return mechanism 22G includes a return spring. The return spring is made of, for example, a coil spring. The return mechanism 22G (the return spring) accumulates a rotational force for moving backward the push rod of the rotation-linear motion conversion mechanism 22D. More specifically, when the braking is applied, the return mechanism 22G applies a rotational force to the push rod of the rotation-linear motion conversion mechanism 22D in a braking releasing direction. The return mechanism 22G releases the braking force applied from the brake pads 22F to the disk rotor D due to the piston 22E when a failure has occurred in the electric motor 22B or the like during the braking.

The parking mechanism 23 is provided to each of the brake mechanisms 22 and 22, i.e., each of the brake mechanism 22 on the left side (the rear left wheel 5L side) and the brake mechanism 22 on the right side (the rear right wheel 5R side). The parking mechanism 23 keeps the piston 22E of the brake mechanism 22 in the forward thrust state. In other words, the parking mechanism 23 holds the braking force with the brake pads 22F pressed against the disk rotor D. Further, the parking mechanism 23 releases the holding of the braking force. The parking mechanism 23 is formed by a ratchet mechanism (a lock mechanism), which prohibits (locks) the rotation by engaging an engagement claw (a lever member 23C) with a ratchet (a ratchet gear 23B) as illustrated in, for example, FIGS. 3(A)-3(C). More specifically, the parking mechanism 23 includes a solenoid 23A, the ratchet gear 23B serving as the ratchet, the lever member 23C serving as the engagement claw, and a compression spring 23D serving as a return spring. The solenoid 23A is driven by supply of power thereto (a plunger 23A1 thereof is displaced). The solenoid 23A is controlled by the main ECU 10 and the rear electric brake ECU 24.

Figure 3A:
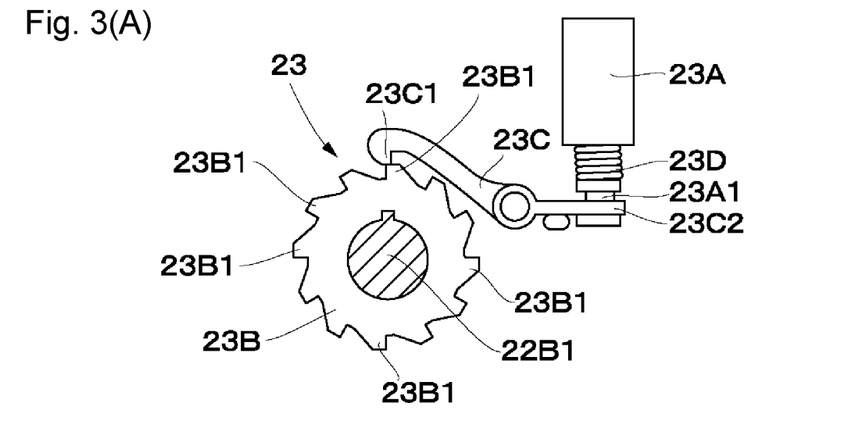
FIGS. 3(A)-3(C) illustrate an operation of a parking mechanism.
Figure 3B:
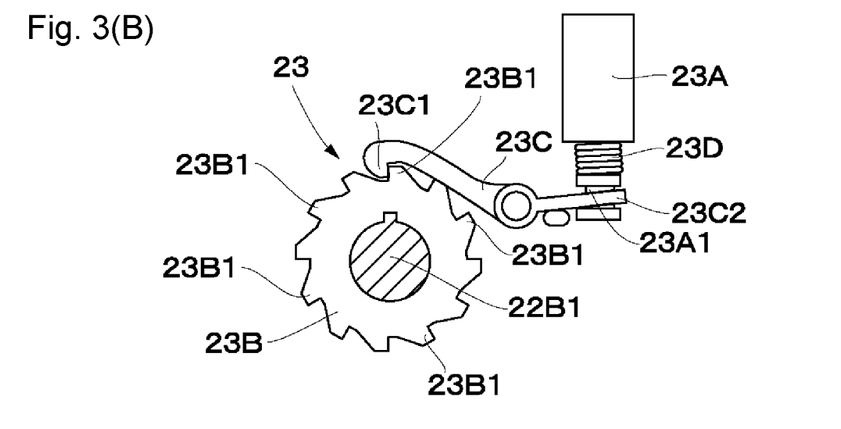
Figure 3C:
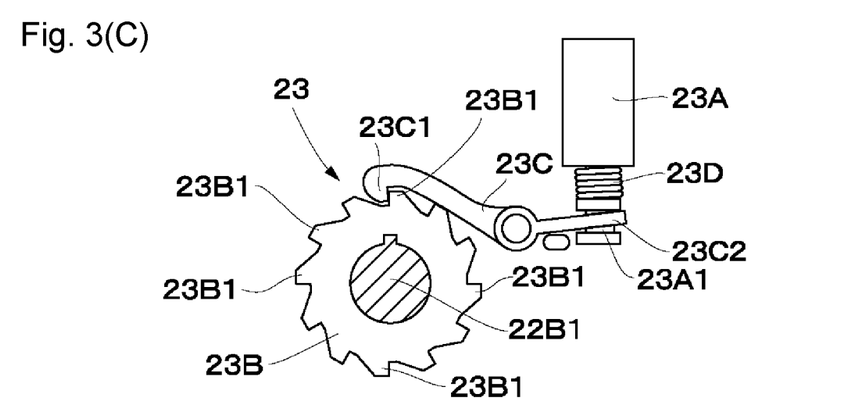

The ratchet gear 23B is integrally fixed to the rotational shaft 22B1 of the electric motor 22B of the brake mechanism 22. A plurality of claws 23B1 is provided on the outer peripheral side of the ratchet gear 23B at even intervals circumferentially. The claw 23B1 is engaged with a claw portion 23C1 of the lever member 23C. The claw portion 23C1 and a coupling portion 23C2 are formed on one end side and the other end side of the lever member 23C, respectively. The claw portion 23C1 is engaged with the claw 23B1 of the ratchet gear 23B. The coupling portion 23C2 is coupled with the plunger 23A1 of the solenoid 23A. The lever member 23C is reciprocated by the solenoid 23A so as to be engaged with or separated from the claw 23B1 of the ratchet gear 23B. The compression spring 23D applies an elastic force for separating the claw portion 23C1 of the lever member 23C from the claw 23B1 of the ratchet gear 23B.

The rear electric brake ECU 24 is provided in correspondence with each of the brake mechanisms 22 and 22, i.e., each of the brake mechanism 22 on the left side (the rear left wheel 5L side) and the brake mechanism 22 on the right side (the rear right wheel 5R side). The rear electric brake ECU 24 includes a microcomputer. The rear electric brake ECU 24 controls the brake mechanism 22 (the electric motor 22B) and the parking mechanism 23 (the solenoid 23A) based on the instruction from the main ECU 10. In other words, the rear electric brake ECU 24 forms a controller (the electric brake controller) that controls the driving of the electric motor 22B and the actuation of the parking mechanism 23 together with the main ECU 10. The rear electric brake ECU 24 controls the driving of the electric motor 22B based on the braking instruction (the target thrust force). Along therewith, the rear electric brake ECU 24 controls the driving (the actuation) of the parking mechanism 23 (the solenoid 23A) based on the actuation instruction. The braking instruction and the actuation instruction are input from the main ECU 10 to the rear electric brake ECU 24.

The rotational angle sensor 25 detects the rotational angle of the rotational shaft 22B1 of the electric motor 22B (a motor rotational angle). The rotational angle sensor 25 is provided in correspondence with each of the respective electric motors 22B of the brake mechanisms 22, and forms the position detector that detects the rotational position of the electric motor 22B (the motor rotational position). The thrust force sensor 26 detects a reaction force to the thrust force (the pressing force) applied from the piston 22E to the brake pads 22F. The thrust force sensor 26 is provided to each of the brake mechanisms 22, and forms the thrust force detector that detects the thrust force applied to the piston 22E (the piston thrust force). The current sensor 27 detects a current supplied to the electric motor 22B (the motor current). The current sensor 27 is provided in correspondence with each of the respective electric motors 22B of the brake mechanisms 22, and forms the current detector that detects the motor current of the electric motor 22B. The rotational angle sensor 25, the thrust force sensor 26, and the current sensor 27 are connected to the rear electric brake ECU 24.

The rear electric brake ECU 24 (and the main ECU 10 connected to this rear electric brake ECU 24 via the CAN 13) can acquire the rotational angle of the electric motor 22B based on the signal from the rotational angle sensor 25. The rear electric brake ECU 24 (and the main ECU 10) can acquire the thrust force applied to the piston 22E based on the signal from the thrust force sensor 26. The rear electric brake ECU 24 (and the main ECU 10) can acquire the motor current supplied to the electric motor 22B based on the signal from the current sensor 27.

Next, the operation of applying the braking and releasing the braking by the electric brake apparatus 21 while the vehicle 1 is running will be described. In the following description, this operation will be described citing the operation when the driver operates the brake pedal 6 as an example. However, the electric brake apparatus 21 also operates approximately similarly even in the case of autonomous brake, except that the operation in this case is different in terms of, for example, the fact that an instruction for the autonomous brake is output from an autonomous brake ECU (not illustrated) or the main ECU 10 to the rear electric brake ECU 24.

For example, when the driver operates the brake pedal 6 by pressing it while the vehicle 1 is running, the main ECU 10 outputs the instruction according to the pressing operation on the brake pedal 6 (for example, the target thrust force corresponding to the instruction to apply the braking) to the rear electric brake ECU 24 based on the detection signal input from the pedal stroke sensor 9. The rear electric brake ECU 24 drives (rotates) the electric motor 22B in a forward direction, i.e., in a braking application direction (an application direction) based on the instruction from the main ECU 10. The rotation of the electric motor 22B is transmitted to the rotation-linear motion conversion mechanism 22D via the speed reduction mechanism 22C, and the piston 22E is moved forward toward the brake pads 22F.

As a result, the brake pads 22F and 22F are pressed against the disk rotor D, and the braking force is applied. The braking state is established by controlling the driving of the electric motor 22B based on the detection signals from the pedal stroke sensor 9, the rotational angle sensor 25, the thrust force sensor 26, and the like at this time. While such control is ongoing, a force in a braking release direction is applied to the push rod of the rotation-linear motion conversion mechanism 22D and thus the rotational shaft 22B1 of the electric motor 22B by the return mechanism 22G (the return spring) provided to the brake mechanism 22.

On the other hand, when the brake pedal 6 is operated toward a pressing release side, the main ECU 10 outputs an instruction according to this operation (for example, the target thrust force corresponding to the braking release instruction) to the rear electric brake ECU 24. The rear electric brake ECU 24 drives (rotates) the electric motor 22B in a reverse direction, i.e., the braking release direction (a release direction) based on the instruction from the main ECU 10. The rotation of the electric motor 22B is transmitted to the rotation-linear motion conversion mechanism 22D via the speed reduction mechanism 22C, and the piston 22E is moved backward in a direction away from the brake pads 22F. Then, when the pressing of the brake pedal 6 is completely released, the brake pads 22F and 22F are separated from the disk rotor D, thereby releasing the braking force. In a non-braking state in which the braking is released in this manner, the return mechanism 22G (the return spring) provided to the brake mechanism 22 is returned to the initial state thereof.

Next, the operation of providing (applying) the braking and ending (releasing) the braking by the parking brake will be described. In the following description, this operation will be described citing the operation when the driver operates the parking brake switch 15 as an example. However, the parking brake also operates approximately similarly even in the case of autonomous parking brake (automatic application and automatic release), except that the operation in this case is different in terms of, for example, the fact that an instruction therefor (an automatic application instruction and an automatic release instruction) is output based on a determination about the autonomous parking brake by the main ECU 10.

FIGS. 3(A)-3(C) are schematic views (illustrative drawings) indicating the actuation state of the parking brake mechanism (the parking mechanism 23). For example, when the parking brake switch 15 is operated toward an application side by the driver, the main ECU 10 actuates (applies) the parking brake. In this case, the main ECU 10 first rotates the electric motor 22B of the brake mechanism 22 toward a thrust force generation side (the application side: the clockwise direction in FIGS. 3(A)-3(C)) via the rear electric brake ECU 24, thereby pressing the brake pads 22F and 22F against the disk brake D with a desired force (for example, a force capable of keeping the vehicle 1 stopped). In this state, the main ECU 10 actuates the solenoid 23A of the parking mechanism 23 via the rear electric brake ECU 24. More specifically, the main ECU 10 presses the claw portion 23C1 of the lever member 23C against the claw 23B1 of the ratchet gear 23B by retracting the plunger 23A1 of the solenoid 23A (displacing it upward in FIGS. 3(A)-3(C). At this time, these claw portion 23C1 and claw 23B1 may fail to be engaged with each other due to abutment (interference) of the claw portion 23C1 of the lever member 23C with the top edge of the claw 23B1 of the gear 23B as illustrated in FIG. 3(A).

The main ECU 10 next rotates the electric motor 22B toward a force reduction side (the release side: the counterclockwise direction in FIGS. 3(A)-3(C)) via the rear electric brake ECU 24. This rotation can ensure that the claw portion 23C1 and the claw 23B1 are engaged with each other as illustrated in FIG. 3(B) even when the claw portion 23C1 and the claw 23B1 has failed to be engaged with each other. In this state, the main ECU 10 stops the power supply to the electric motor 22B and also stops the power supply to the solenoid 23A after confirming whether a predetermined thrust force (for example, the thrust force capable of keeping the vehicle stopped) is achieved with use of, for example, the thrust force sensor 26. At this time, the rotational force in the force reduction side (the release side) (the force in the counterclockwise direction in FIGS. 3(A)-3(C)) is applied to the ratchet gear 23B (i.e., the rotational shaft 22B1 of the electric motor 22B) based on the elastic force of the return mechanism 22G (the return spring) provided to the brake mechanism 22. Therefore, the engagement state between the claw portion 23C1 and the claw 23B1 is maintained as illustrated in FIG. 3(C) even after the power supply to the solenoid 23A is stopped. This allows the braking state to be maintained with the power supply stopped for the electric motor 22B and the solenoid 23A.

On the other hand, when the parking brake switch 15 is operated toward a release side, the main ECU 10 ends (releases) the actuation of the parking brake. In this case, the main ECU 10 slightly rotates the electric motor 22B toward the thrust force generation side (the application side) without supplying power to the solenoid 23A. As a result, the engagement between the claw portion 23C1 of the lever member 23C and the claw 23B1 of the ratchet gear 23B is loosened, and the lever member 23C is pivotally moved in a direction for releasing the engagement between the claw portion 23C1 and the claw 23B1 (the clockwise direction) due to the spring force of the compression spring 23D. Then, the main ECU 10 rotates the electric motor 22B in the force reduction side (the release side) to release the braking after confirming whether the thrust force changes with use of the thrust force sensor 26.

Next, re-holding control (re-clamping) of the parking brake will be described.

The main ECU 10 (and/or the rear electric brake ECU 24) may further drive (re-hold, re-clamp, re-apply, additionally fasten, or additionally pull) the electric motor 22B as necessary after a predetermined time has passed since the application of the parking brake. For example, the temperature of the disk rotor D and the temperature of the brake pads 22F (a pad temperature) increase (become high temperatures) due to the use of the service brake while the vehicle 1 is running. In this case, the thrust force may reduce along with thermal contraction if the temperatures of the disk rotor D and the brake pads 22F reduce after the electric motor 22B is driven and the parking brake is applied (clamped). Therefore, the main ECU 10 takes this reduction in the thrust force corresponding to the thermal contraction into consideration, and re-applies the braking, i.e., performs the re-holding control (re-clamping) after the predetermined time has passed since the first application (clamping) (for example, several minutes after the reductions in the temperatures of the disk rotor D and the brake pads 22F). The re-holding control (the re-clamping) compensates for the thrust force corresponding to the thermal contraction by being automatically carried out based on control after the application (the clamping) according to the parking brake operation by the driver.

The re-holding control (the re-clamping) is started with the claw portion 23C1 and the claw 23B1 kept in the engagement state (FIG. 3(c)). The engagement between the claw portion 23C1 of the lever member 23C and the claw 23B1 of the ratchet gear 23B is loosened by rotating the electric motor 22B toward the thrust force generation side (the application side) without supplying power to the solenoid 23A. Further, the lever member 23C is pivotally moved in the direction for releasing the engagement between the claw portion 23C1 and the claw 23B1 (the clockwise direction) due to the spring force of the compression spring 23D. After that, the rotation toward the thrust force generation side (the application side) continues until the thrust force reaches the target thrust force for the re-clamping similarly to when the braking is applied. Then, the operation for actuating the solenoid 23A is started after the thrust fore reaches the target thrust force for the re-clamping. The subsequent operation is performed in a similar manner to when the braking is applied, and therefore the description thereof will be omitted here.

Then, supposing that a failure leading to fail-open has occurred with the claw portion 23C1 and the claw 23B1 disengaged during the re-holding control, i.e., in the state illustrated in FIG. 3(A) during the re-holding control, a possible consequence in this case will be described now. In this case, when a failure leading to fail-open, such as a "power supply disruption failure in the electric motor 22B" and a "power supply disruption failure in the main ECU 10", has occurred, the thrust force is released by the return mechanism 22G serving as the fail-open mechanism and becomes zero. As a result, the performance of keeping the vehicle stopped may decline. The re-holding control is started after the predetermined time (for example, several minutes) has passed since the first application (clamping) according to the parking brake operation performed by the driver, and is highly likely carried out when the driver is absent. It is undesirable that the thrust forces (the braking forces) on both the wheels reduce due to the fail-open mechanism with the driver highly likely absent in this manner.

Figure 6:
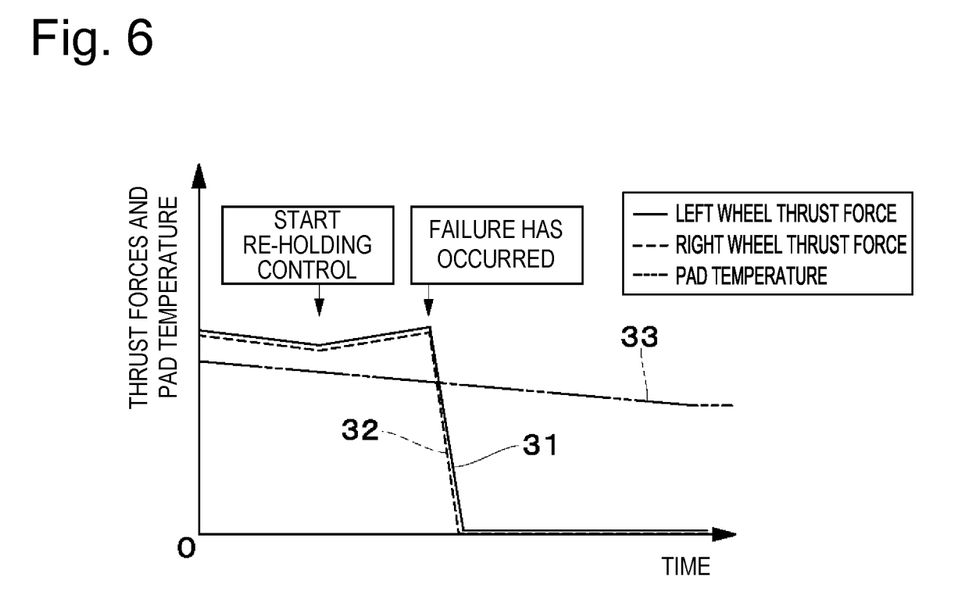
FIG. 6 illustrates lines representing characteristics indicating changes in the left wheel thrust force, the right wheel thrust force, and the pad temperature over time when re-holding control according to a comparison example is performed.

FIG. 6 is a timing chart (illustrates lines representing the characteristics of changes in the thrust forces and the pad temperature over time) during the re-holding control according to a comparison example. In FIG. 6, a solid line 31 corresponds to the thrust force in the brake mechanism 22 on the rear left wheel 5L side, a broken line 32 corresponds to the thrust force in the brake mechanism 22 on the rear right wheel 5R side, and a long dashed double-short dashed line 33 corresponds to the pad temperature. In the comparison example, the re-holding control is actuated on both the wheels at the same time. As illustrated in FIG. 6, the thrust forces on the left and right wheels (the solid line 31 and the broken line 32) are reducing due to the thermal contraction of the pads along with the reduction in the pad temperature (the long dashed double-short dashed line 33). The re-holding control operates so as to apply the braking again before the thrust forces completely reduce by estimating these reductions in the thrust forces due to the temperature reduction, thereby compensating for the braking corresponding to the reductions in the thrust forces. However, if the re-holding control is actuated on both the wheels simultaneously, the thrust forces may become zero on both the left and right wheels due to the fail-open mechanism if a failure has occurred before normal completion of the re-holding control.

On the other hand, the brake apparatus discussed in the above-described patent literature, PTL 1 is configured to stagger the timings of actuating the left and right electric parking brakes, thereby suppressing the voltage drop and succeeding in generating a predetermined thrust force (a required braking force), for the purpose of preventing a reduction in the generated thrust force when the voltage is low. Further, the brake apparatus discussed in PTL 2 estimates the estimated temperature of the disk rotor with use of the frictional coefficient of the brake pads (the pads). However, PTLs 1 and 2 fail to discuss the operation when a failure has occurred during the re-holding control (during the re-clamping).

Under these circumstances, the embodiment starts the re-holding control (the re-clamping) on only any one of the left and right wheels and starts the re-holding control (re-clamping) on the other of the wheels after completing the re-holding control (the re-clamping) on this one of the wheels when performing the re-holding control (the re-clamping) so as to be able to curb the decline in the performance of keeping the vehicle stopped even when a failure (for example, a failure leading to fail-open) has occurred during the re-holding control (the re-clamping). In other words, the embodiment does not release the holding of the braking force on the other of the wheels until completing the re-holding control on any one of the left and right wheels when performing the re-holding control. As a result, the embodiment can maintain the braking force on the other of the wheels during the re-holding control on the one of the wheels, thereby curbing the decline in the performance of keeping the vehicle stopped even when a failure has occurred during the re-clamping.

This will be described more specifically. In the embodiment, the main ECU 10 performs the re-holding control of, after holding the braking force by the parking mechanism 23, releasing the holding of the braking force with this braking force applied or maintained and further applying the braking force, and then holding this braking force by the parking mechanism 23 after that. In this case, until completing the re-holding control on any one of the left and right wheels (for example, the rear left wheel 5L), the main ECU 10 does not release the holding of the braking force on the other of the wheels (for example, the rear right wheel 5R). In sum, the main ECU 10 desynchronizes the re-clamping between the left and right wheels, i.e., the rear left wheel 5L, which is the left wheel, and the rear right wheel 5R, which is the right wheel, when performing the re-clamping. In other words, the main ECU 10 does not perform the re-clamping on the rear left wheel 5L and the re-lamping on the rear right wheel 5R in synchronization with each other (does not perform them at the same time) when performing the re-clamping. The main ECU 10 desynchronizes the re-lamping on the rear left wheel 5L and the re-clamping on the rear right wheel 5R by performing the re-clamping on the rear left wheel 5L and the re-clamping on the rear right wheel 5R in a temporally staggered manner (staggering the start timings thereof).

In this case, after completing the re-holding control on one of the wheels (for example, the rear left wheel 5L), the main ECU 10 starts the re-holding control on the other of the wheels (for example, the rear right wheel 5R). More specifically, the main ECU 10 starts the release of the engagement at the parking mechanism 23 on the other of the wheels (i.e., the driving of the electric motor 22B toward the application side) after completing the engagement at the parking mechanism 23 (the engagement between the claw portion 23C1 and the claw 23B1) on one of the wheels. Further, if being brought into a state incapable of holding the braking force during the re-holding control on one of the wheels (for example, the rear left wheel 5L), the main ECU 10 does not start the re-holding control on the other of the wheels (for example, the rear right wheel 5R). In other words, if being brought into a state incapable of holding the braking force during a period since the release until the re-establishment of the engagement at the parking mechanism 23 (the engagement between the claw portion 23C1 and the claw 23B1) on the one of the wheels, the main ECU 10 does not start the release of the engagement at the parking mechanism 23 (i.e., the driving of the electric motor 22B toward the application side) on the other of the wheels.

Now, the re-holding control on the one of the wheels (for example, the rear left wheel 5L) that is performed first can be started based on the estimated temperature of the disk rotor D. The temperature of the disk rotor D can be estimated with use of, for example, the technique discussed in PTL 2. The re-holding control can be started, for example, when the present estimated temperature of the disk rotor D falls below a preset predetermined temperature (a predetermined value, a threshold value, or a criterion value). Alternatively, the re-holding control can be started, for example, when the temperature difference between the estimated temperature of the disk rotor D when the braking is first applied and the present estimated temperature exceeds a preset predetermined temperature difference (a predetermined value, a threshold value, or a criterion value).

Alternatively, the re-holding control may be started based on, for example, the thrust force (the piston thrust force) besides the estimated temperature. More specifically, the re-holding control may be started, for example, when the present piston thrust force falls below a preset predetermined thrust force (a predetermined value, a threshold value, or a criterion value). A detected value or an estimated value (an estimated thrust force) can be used as the thrust force. Further alternatively, the re-holding control may be started, for example, based on a time elapse. More specifically, the re-holding control may be started after a predetermined time (a predetermined value, a threshold value, or a criterion value) has elapsed since the first application. In this case, the re-holding control may be started after the preset predetermined time (the predetermined value, the threshold value, or the criterion value) has elapsed on condition that the estimated temperature of the disk rotor D at the time of the first application exceeds a preset predetermined temperature (a predetermined value, a threshold value, or a criterion value).

Figure 4:
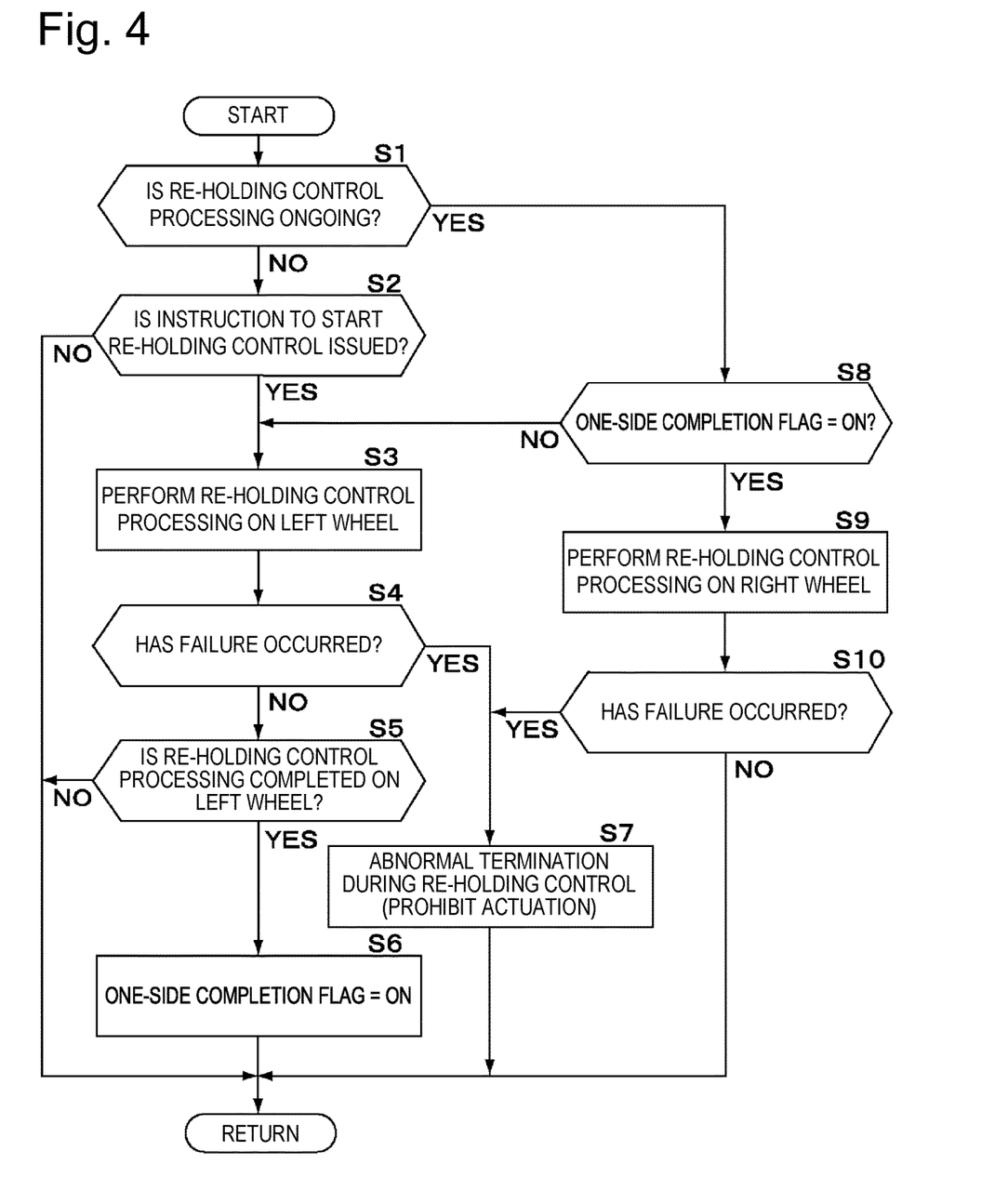
FIG. 4 is a flowchart illustrating re-holding control processing on a parking brake.

To realize such re-holding control processing, a processing program for performing the processing flow illustrated in FIG. 4, i.e., a processing program for use in the re-holding control processing is stored in the memory of the main ECU 10. Then, the control processing performed by a calculation circuit of the main ECU 10 will be described with reference to the flow diagram (the flowchart) illustrated in FIG. 4. The control processing illustrated in FIG. 4 is repeatedly performed per predetermined control cycle (for example, 10 msec) while power is kept supplied to the main ECU 10.

For example, when the control processing illustrated in FIG. 4 is started due to the start of the power supply to the main ECU 10, in S1, the main ECU 10 determines whether the re-holding control processing is ongoing. More specifically, in S1, the main ECU 10 determines whether the re-holding control processing is ongoing on the rear left wheel 5L side (the re-clamping operation is ongoing on the rear left wheel 5L side) or the re-holding control processing is ongoing on the rear right wheel 5R side (the re-clamping operation is ongoing on the rear right wheel 5R side). If the main ECU 10 determines "NO" in S1, i.e., determines that the re-holding control processing is not ongoing, the processing proceeds to S2. If the main ECU 10 determines "YES" in S1, i.e., determines that the re-holding control processing is ongoing, the processing proceeds to S8.

In S2, the main ECU 10 determines whether an instruction to start the re-holding control is issued. More specifically, in S2, the main ECU 10 determines whether the vehicle 1 satisfies the condition for starting the re-holding control, such as the condition that the present estimated temperature of the disk rotor D falls below the preset predetermined temperature (the predetermined value, the threshold value, or the criterion value). If the main ECU 10 determines "YES" in S2, i.e., determines that an instruction to start the re-holding control is issued (the condition for starting the re-holding control is satisfied), the processing proceeds to S3. On the other hand, if the main ECU 10 determines "NO" in S3, i.e., determines that no instruction to start the re-holding control is issued (the condition for starting the re-holding control is not satisfied), the processing proceeds to RETURN. In other words, the processing returns to START via RETURN, and the processing in and after S1 is repeated.

In S3, the main ECU 10 performs (starts or continues) the re-holding control processing on the rear left wheel 5L side. For example, if the processing proceeds from S2 to S3, the main ECU 10 starts the re-holding control processing on the rear left wheel 5L side. If the processing proceeds from S8 to S3, the main ECU 10 continues the re-holding control processing on the rear left wheel 5L side. In S3, the main ECU 10 starts or continues the diving of the electric motor 22B on the rear left wheel 5L side, and also drives the solenoid 23A if necessary. After the re-holding control processing is performed (started or continued) in S3, the processing proceeds to S4.

In S4, the main ECU 10 determines whether a failure has occurred. More specifically, in S4, the main ECU 10 monitors a failure during the re-holding control on the rear left wheel 5L side. In S4, the main ECU 10 determines whether the rear left wheel 5L side is subjected to, for example, such a failure that the thrust force detected by the thrust force sensor 26 does not reach the predetermined thrust force despite power supplied to the electric motor 22B. If the main ECU 10 determines "NO" in S4, i.e., determines that no failure has occurred, the processing proceeds to S5. On the other hand, if the main ECU 10 determines "YES" in S4, i.e., determines that a failure has occurred, the processing proceeds to S7.

In S5, the main ECU 10 determines whether the re-holding control processing is completed on the rear left wheel 5L side. In S5, the main ECU 10 determines, for example, whether the thrust force detected by the thrust force sensor 26 on the rear left wheel 5L side reaches the predetermined thrust force and the engagement (the engagement between the claw portion 23C1 and the claw 23B1) is established at the parking mechanism 23 on the rear left wheel 5L side. If the main ECU 10 determines "NO" in S5, i.e., determines that the re-holding control processing is not completed on the rear left wheel 5L side, the processing proceeds to RETURN without proceeding via S6. On the other hand, if the main ECU 10 determines "YES" in S5, i.e., determines that the re-holding control processing is completed on the rear left wheel 5L side, the processing proceeds to S6. In step S6, the main ECU 10 sets a one-side completion flag to "ON". The one-side completion flag is a flag indicating that the re-holding control processing is completed on the rear left wheel 5L side, and is set to ON when the re-holding control processing is completed on the rear left wheel 5L side. After the one-side completion flag is set to "ON" in S6, the processing proceeds to RETURN.

On the other hand, if a failure has occurred during the re-holding control on the rear left wheel 5L side, the main ECU 10 determines "YES" in S4 and the processing proceeds to S7. This case corresponds to the state incapable of holding the braking force during the re-holding control. Therefore, in S7, the main control ECU 10 ends the braking holding control (an abnormal termination during the re-holding control). For example, if the processing proceeds to S7 after the main ECU 10 determines "YES" in S4, the main ECU 10 prohibits the re-holding control processing on the rear right wheel 5R side along with stopping the re-holding control processing on the rear left wheel 5L side so as to cancel the re-holding control processing after that. In other words, in S7, the main ECU 10 prohibits the PKB control including the re-holding control after that. After the re-holding control processing is canceled in S7, the processing proceeds to RETURN. In this case, the processing does not proceed from RETURN to START, and the main ECU 10 performs, for example, fail-safe processing. More specifically, the main ECU 10 performs processing for notifying the driver, such as blinking the parking brake actuation lamp, lighting up the warning lamp, and displaying the occurrence of a failure on the monitor of the car navigation system or the instrument monitor, and then ends the processing illustrated in FIG. 4. This processing allows the main ECU 10 to refrain from starting the re-holding control on the rear right wheel 5R side when being brought into the state incapable of holding the braking force during the re-holding control on the rear left wheel 5L side.

On the other hand, in S8 subsequent to "YES" in S1, the main ECU 10 determines whether the one-side completion flag is set to "ON". In other words, in S8, the main ECU 10 determines whether the re-holding control processing on the rear left wheel 5L side that has been started first is completed. If the main ECU 10 determines "NO" in S8, i.e., determines that the one-side completion flag is set to OFF, the processing proceeds to S3 and the main ECU 10 performs (continues) the re-holding control processing on the rear left wheel 5L side. Due to this flow, the processing of S1, S8, S3, S4, and S5 is repeated until the re-holding control processing is completed on the rear left wheel 5L side. Further, if a failure has occurred during that (during the repetition), the processing proceeds from S4 to S7, which allows the main ECU 10 to cancel the re-holding control processing (prohibit the actuation thereof).

On the other hand, if the main ECU 10 determines "YES" in S8, i.e., determines that the one-side completion flag is set to ON, the processing proceeds to S9. In S9, the main ECU 10 performs (starts or continues) the re-holding control processing on the rear right wheel 5R side. For example, if the processing proceeds to S9 for the first time, the main ECU 10 starts the re-holding control processing on the rear right wheel 5R side. This flow allows the main ECU 10 to start the re-holding control on the rear right wheel 5R after completing the re-holding control on the rear left wheel 5L. In S9, the main ECU 10 starts or continues the diving of the electric motor 22B on the rear right wheel 5R side, and also drives the solenoid 23A if necessary. After the re-holding control processing is performed (started or continued) in S9, the processing proceeds to S10.

In S10, the main ECU 10 determines whether a failure has occurred. More specifically, in S10, the main ECU 10 monitors a failure during the re-holding control on the rear right wheel 5R side. In S10, the main ECU 10 determines whether the rear right wheel 5R side is subjected to, for example, such a failure that the thrust force detected by the thrust force sensor 26 does not reach the predetermined thrust force despite power supplied to the electric motor 22B. If the main ECU 10 determines "NO" in S10, i.e., determines that no failure has occurred, the processing proceeds to RETURN. On the other hand, if the main ECU 10 determines "YES" in S10, i.e., determines that a failure has occurred, the processing proceeds to S7. If the main ECU 10 determines "YES" in S10 and the processing proceeds to S7, the main ECU 10 cancels the re-holding control processing on the rear right wheel 5R side, and the processing proceeds to RETURN. In this case, the main ECU 10 also performs the fail-safe processing, i.e., the processing for notifying the driver that a failure has occurred, and then ends the processing illustrated in FIG. 4. Due to this flow, the processing of S1, S8, S9, and S10 is repeated until the re-holding control processing is completed on the rear right wheel 5R side. Further, if a failure has occurred during that (during the repetition), the processing proceeds from S10 to S7, which allows the main ECU 10 to cancel the re-holding control processing (prohibit the actuation thereof).

When being stopped due to a failure such as the power supply disruption during the re-holding control (during the actuation on one side), i.e., in the middle of performing the re-holding control processing illustrated in FIG. 4 by the main ECU 10, the main ECU 10 becomes unable to perform the processing illustrated in FIG. 4, thereby becoming unable to determine whether a failure has occurred in S4 or S10. However, by being stopped, the main ECU 10 also becomes unable to control (drive) the electric motor 22B, thereby operating as fail-open (the thrust force becomes zero). This yields the same result as the fail-open acquired due to the continuation of the re-holding control processing illustrated in FIG. 4 (the route in which the processing proceeds to S7 after a failure is determined in S4 and S10).

Figure 5A:
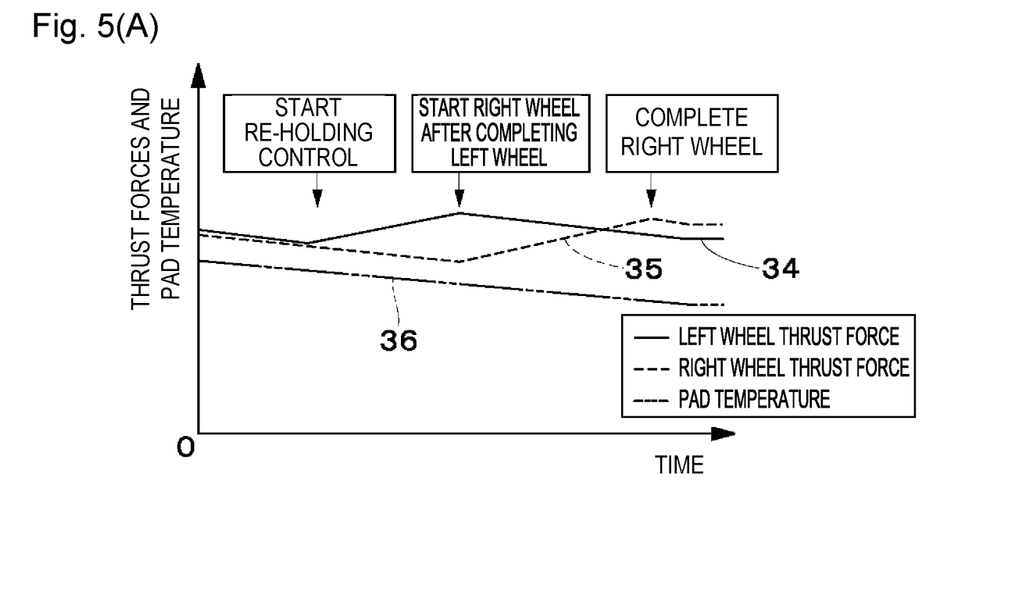
FIGS. 5(A)-5(B) illustrate lines representing characteristics indicating two examples of changes in a left wheel thrust force, a right wheel thrust force, and a pad temperature over time when the re-holding control according to the embodiment is performed.
Figure 5B:
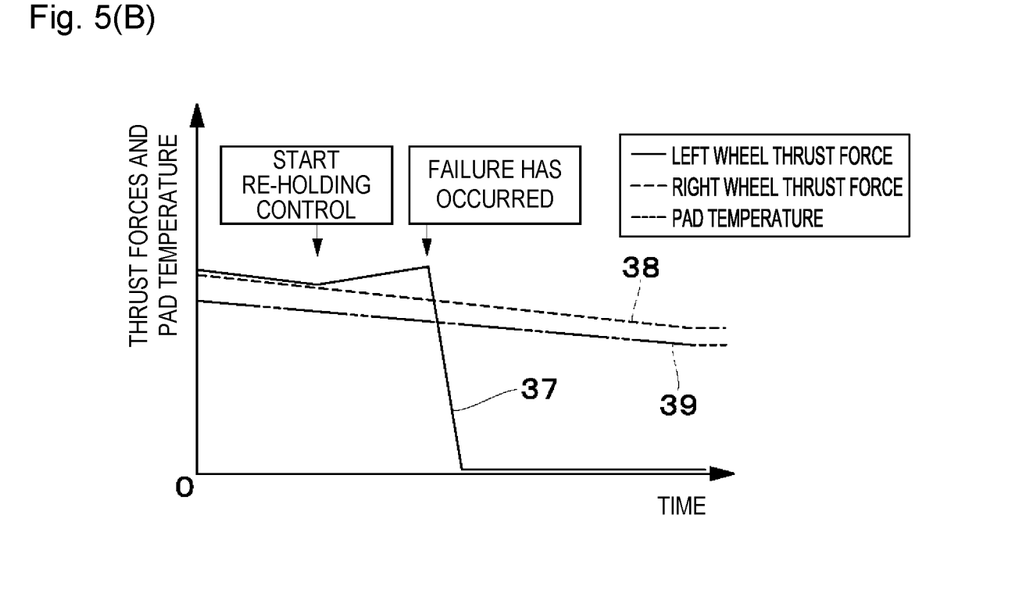

FIGS. 5(A)-5(B) are timing charts (illustrate lines representing the characteristics of changes in the thrust forces and the pad temperature over time) during the re-holding control according to the embodiment. In FIGS. 5(A)-5(B), solid lines 34 and 37 correspond to the thrust force in the brake mechanism 22 on the rear left wheel 5L side, broken lines 35 and 38 correspond to the thrust force in the brake mechanism 22 on the rear right wheel 5R side, and long dashed double-short dashed lines 36 and 39 correspond to the pad temperature. In the embodiment, until the re-holding control is completed on one of the wheels (the rear left wheel 5L side), the re-holding control is not started on the other of the wheels (the rear right wheel 5R side).

FIG. 5(A) illustrates the lines representing the characteristics when no failure has occurred during the re-holding control, i.e., the re-holding control is normally completed on both the left and right wheels. As illustrated in FIG. 5(A), the re-holding control is started on the rear left wheel 5L side first, and the re-holding control is completed on the rear left wheel 5L side. After that, the re-holding control is started on the rear right wheel 5R side and the re-holding control is completed on the rear right wheel side 5R, whereby the re-holding control is normally competed on both the wheels.

On the other hand, FIG. 5(B) illustrates the lines representing the characteristics when a failure has occurred during the re-holding control processing on the rear left wheel 5L side. As illustrated in FIG. 5(B), the re-holding control is started on the rear left wheel 5L side first, and a failure has occurred before the re-holding control is completed on the rear left wheel 5L side. When a failure has occurred, the thrust force becomes zero on the rear left wheel 5L side due to the return mechanism 22G, but the thrust force remains on the rear right wheel 5R side because the re-holding control is not started on the rear right wheel 5R side. As a result, the decline in the performance of keeping the vehicle stopped can be curbed.

In this manner, according to the embodiment, the main ECU 10 does not release the holding of the braking force on the rear right wheel 5R side until the re-holding control is completed on the rear left wheel 5L side when performing the re-holding control. Therefore, the braking force is maintained on the rear right wheel 5R side until the re-holding control is completed on the rear left wheel 5L side. For this reason, the vehicle can be kept stopped with the aid of the braking force maintained on the rear right wheel 5R even when a failure has occurred during the re-holding control on the rear left wheel 5L side and the braking force reduces (or is released) on this rear left wheel 5L side. As a result, the decline in the performance of keeping the vehicle stopped can be curbed.

According to the embodiment, the main ECU 10 starts the re-holding control on the rear right wheel 5R side after completing the re-holding control on the rear left wheel 5L side. Therefore, the re-holding control is not started on the rear right wheel 5R side if a failure has occurred before the re-holding control is completed on the rear left wheel 5L side. For this reason, the braking force can be maintained on the rear right wheel 5R side even when the braking force reduces (or is released) on the rear left wheel 5L. According to the embodiment, the main ECU 10 does not start the re-holding control on the rear right wheel 5R side if being brought into the state of incapable of holding the braking force on the rear left wheel 5L during the re-holding control on the rear left wheel 5L side. Therefore, the braking force can be maintained on the rear right wheel 5R even when the main ECU 10 is brought into the state of incapable of holding the braking force on the rear left wheel 5L during the re-holding control on the rear left wheel 5L side.

According to the embodiment, the re-holding control is started based on the estimated temperature of the disk rotor D. Therefore, the re-holding can be performed when the re-holding is necessary based on the estimated temperature. According to the embodiment, the main ECU 10 desynchronizes the re-clamping between the rear left wheel 5L side and the rear right wheel 5R side when performing the re-clamping. Therefore, even when a failure has occurred on one of the rear left wheel 5L side and the rear right wheel 5R side during the re-clamping and the braking force reduces (or is released) on this one 5L (5R) of the rear wheels, the vehicle can be kept stopped with the aid of the braking force maintained by the other 5R (5L) of the rear wheels. As a result, the decline in the performance of keeping the vehicle stopped can be curbed. According to the embodiment, the return mechanism 22G serving as the fail-open mechanism is provided. Therefore, at the time of the occurrence of such a failure that the electric motor 22B cannot generate the torque when the parking mechanism 23 does not hold the braking force, the braking force can become zero (fail-open) and the driving can continue. Further, even when a failure has occurred during the re-holding control and the braking force is released due to the return mechanism 22G, the decline in the performance of keeping the vehicle stopped can be curbed.

In the embodiment, the electric brake apparatus has been described based on the example configured to move the rear left wheel 5L side first at the time of the re-holding control, more specifically, configured not to release the holding of the braking force (not to start the re-holding control) on the rear right wheel 5R side until completing the re-holding control on the rear left wheel 5L side. In other words, the electric brake apparatus has been described based on the example configured to start the re-holding control on the rear right wheel 5R side after completing the re-holding control on the rear left wheel 5L side. However, the electric brake apparatus is not limited thereto, and may be configured to move the rear right wheel 5R side first at the time of the re-holding control, more specifically, configured not to release the holding of the braking force (not to start the re-holding control) on the rear left wheel 5L side until completing the re-holding control on the rear right wheel 5R side. In other words, the electric brake apparatus may be configured to start the re-holding control on the rear left wheel 5L side after completing the re-holding control on the rear right wheel 5R side.

In the embodiment, the electric brake apparatus has been described based on the example configured to include the return mechanism 22G in the brake mechanism 22 as the fail-open mechanism. However, the electric brake apparatus is not limited thereto, and, for example, may be configured not to include the return mechanism (the fail-open mechanism).

In the embodiment, the electric brake apparatus has been described based on the example configured in such a manner that the "main ECU 10", the "rear electric brake ECU 24 on the rear left wheel 5L side", and the "rear electric brake ECU 24 on the rear right wheel 5R side" are prepared as individually different ECUs from one another, and these three ECUs are connected via the CAN 13, which is the vehicle data bus. More specifically, the electric brake apparatus has been described based on the example in which the three ECUs, the main ECU 10 and the left and right rear electric brake ECUs 24 and 24 are configured as the controller for the electric brake apparatuses 21 and 21 (the electric brake controller). However, the electric brake apparatus is not limited thereto, and, for example, the main ECU and the rear electric brake ECUs may be formed by one ECU. In other words, a controller that controls the left and right electric motors and the left and right parking mechanisms (solenoids) may be formed by one ECU.

In the embodiment, the electric brake apparatus has been described based on the example in which the rear electric brake ECU 24 is attached to the brake mechanism 22, by which these brake mechanism 22 and rear electric brake ECU 24 are configured as one unit (assembly). However, the electric brake apparatus is not limited thereto, and, for example, the brake mechanism and the rear electric brake ECU may be disposed while being separated from each other. In this case, individually different electric brake ECUs (rear electric brake ECUs) may be provided for the left side (the rear left wheel side) and the right side (the rear right wheel side), respectively, or the rear electric brake ECU may be configured as one (a common) electric brake ECU (rear electric brake ECU) shared by the left side (the rear left wheel side) and the right side (the rear right wheel side).

In the embodiment, the electric brake apparatus has been described based on the example in which the hydraulic brake apparatuses 4 and 4 are provided on the front wheel 3L and 3R side and the electric brake apparatuses 21 and 21 are provided on the rear wheel 5L and 5R side. However, the electric brake apparatus is not limited thereto, and, for example, the electric brake apparatuses and the hydraulic brake apparatuses may be provided on the front wheel side and the rear wheel side, respectively.

In the embodiment, the electric brake apparatus has been described based on the example configured to include the parking mechanisms 23 and 23 in the left and right electric brake apparatuses 21 and 21 on the rear wheel side. However, the electric brake apparatus is not limited thereto, and, for example, the electric brake apparatus equipped with the parking mechanism may be disposed on each of the front left wheel side and the front right wheel side. Alternatively, the electric brake apparatus equipped with the parking mechanism may be disposed on each of the four front left and right wheels and rear left and right wheels. In other words, the vehicle may be configured in such a manner that the electric brake apparatus is disposed on each of the four front left and right wheels and rear left and right wheels, and the parking mechanisms is provided to the electric brake apparatus on each of the front left and right wheels and/or rear left and right wheels along therewith. In sum, the electric brake apparatus on at least a pair of left and right wheels, among the wheels of the vehicle, can be formed by the electric brake apparatus equipped with the parking mechanism.

Possible configurations as the electric brake apparatus based on the above-described embodiment include the following examples.

As a first configuration, an electric brake apparatus includes a brake mechanism provided for each one of left and right wheels and configured to apply a braking force by thrusting forward a pressing member based on driving of an electric motor and pressing a braking member against a braking receiving member, a braking force holding mechanism configured to hold the braking force with the braking member pressed against the braking receiving member, and a controller configured to control the driving of the electric motor and actuation of the braking force holding mechanism. Until completing re-holding control on any one of the left and right wheels, the controller does not release the holding of the braking force on the other of the wheels, when performing the re-holding control. The re-holding control is control of, after holding the braking force by the braking force holding mechanism, releasing the holding of the braking force with the braking force applied or maintained, and further applying the braking force and then holding the braking force by the braking force holding mechanism after that.

According to this first configuration, the braking force is maintained on the other of the wheels until the re-holding control is completed on the one of the wheels. Therefore, the vehicle can be kept stopped with the aid of the braking force maintained on the other of the wheels even when a failure has occurred during the re-holding control on the one of the wheels and the braking force reduces (or is released) on this one of the wheels. As a result, the decline in the performance of keeping the vehicle stopped can be curbed.

As a second configuration, in the first configuration, the controller starts the re-holding control on the other of the wheels after completing the re-holding control on the one of the wheels. According to this second configuration, the re-holding control is not started on the other of the wheels if a failure has occurred before the re-holding control is completed on the one of the wheels. Therefore, the braking force can be maintained on the other of the wheels even when the braking force reduces (or is released) on the one of the wheels.

As a third configuration, in the first configuration or the second configuration, the controller does not start the re-holding control on the other of the wheels if being brought into a state incapable of holding the braking force during the re-holding control on the one of the wheels. According to this third configuration, the braking force can be maintained on the other of the wheels even when the controller is brought into the state incapable of holding the braking force during the re-holding control on the one of the wheels.

As a fourth configuration, in any of the first configuration to the third configuration, the re-holding control is started based on an estimated temperature of the braking receiving member. According to this fourth configuration, the re-holding can be performed when the re-holding is necessary based on the estimated temperature.

As a fifth configuration, an electric brake apparatus includes a brake mechanism provided for each one of left and right wheels and configured to apply a braking force by thrusting forward a pressing member based on driving of an electric motor and pressing a braking member against a braking receiving member, a braking force holding mechanism configured to hold the braking force with the braking member pressed against the braking receiving member, and a controller configured to control the driving of the electric motor and actuation of the braking force holding mechanism. The controller desynchronizes re-clamping between the left and right wheels when performing the re-clamping.

According to this fifth configuration, even when a failure has occurred on one of the left wheel and the right wheel during the re-clamping and the braking force reduces (or is released) on this one of the wheels, the vehicle can be kept stopped with the aid of the braking force maintained by the other of the wheels. As a result, the decline in the performance of keeping the vehicle stopped can be curbed.

As a sixth configuration, the first configuration or the fifth configuration further includes a fail-open mechanism configured to move the pressing member in a direction for releasing the braking force when the braking force holding mechanism does not hold the braking force and the electric motor does not generate a torque. According to this sixth configuration, at the time of the occurrence of such a failure that the braking force holding mechanism does not hold the braking force and the electric motor cannot generate the torque, the braking force can become zero (fail-open) and the driving can continue. In addition, even when a failure has occurred during the re-holding control (during the re-clamping) and the braking force is released due to the fail-open mechanism, the decline in the performance of keeping the vehicle stopped can be curbed.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-013233 filed on Jan. 29, 2019. The entire disclosure of Japanese Patent Application No. 2019-013233 filed on Jan. 29, 2019 including the specification, the claims, the drawings, and the abstract is incorporated herein by reference in its entirety.

REFERENCE SIGNS LIST 5L rear left wheel (one of left and right wheels or one of the wheels)
5R rear right wheel (one of left and right wheels or the other of the wheels)
10 main ECU (controller)
21 electric brake apparatus
22 brake mechanism
22B electric motor
22E piston (pressing member)

22F brake pad (braking member)
22G return mechanism (fail-open mechanism)
23 parking mechanism (braking force holding mechanism)
24 rear electric brake ECU (controller)
D disk rotor (braking receiving member)

The invention claimed is:

1. An electric brake apparatus comprising:
a brake mechanism provided for each one of left and right wheels, the brake mechanism being configured to apply a braking force by thrusting forward a pressing member based on driving of an electric motor and pressing a braking member against a braking receiving member;
a braking force holding mechanism configured to hold the braking force with the braking member pressed against the braking receiving member; and
a controller configured to control the driving of the electric motor and actuation of the braking force holding mechanism,
wherein, until completing re-holding control on any one of the left and right wheels, the controller does not release the holding of the braking force on the other of the wheels, when performing the re-holding control, the re-holding control being control of, after holding the braking force by the braking force holding mechanism, releasing the holding of the braking force on the other of the wheels with the braking force applied or maintained on any one of the left and right wheels, and further applying the braking force on the other of the wheels and then holding the braking force by the braking force holding mechanism after that.

2. The electric brake apparatus according to claim 1, wherein the controller starts the re-holding control on the other of the wheels after completing the re-holding control on the one of the wheels.

3. The electric brake apparatus according to claim 2, wherein the controller does not start the re-holding control on the other of the wheels if being brought into a state incapable of holding the braking force during the re-holding control on the one of the wheels.

4. The electric brake apparatus according claim 3, wherein the re-holding control is started based on an estimated temperature of the braking receiving member.

5. The electric brake apparatus according claim 2, wherein the re-holding control is started based on an estimated temperature of the braking receiving member.

6. The electric brake apparatus according to claim 1, wherein the controller does not start the re-holding control on the other of the wheels if being brought into a state incapable of holding the braking force during the re-holding control on the one of the wheels.

7. The electric brake apparatus according claim 6, wherein the re-holding control is started based on an estimated temperature of the braking receiving member.

8. The electric brake apparatus according to claim 1, wherein the re-holding control is started based on an estimated temperature of the braking receiving member.

9. The electric brake apparatus according to claim 1, further comprising a fail-open mechanism configured to move the pressing member in a direction for releasing the braking force when the braking force holding mechanism does not hold the braking force and the electric motor does not generate a torque.

* * * * *